Jan. 9, 1951     W. E. HARDIN     2,537,825
SYRINGE HYDROMETER
Filed Oct. 5, 1945
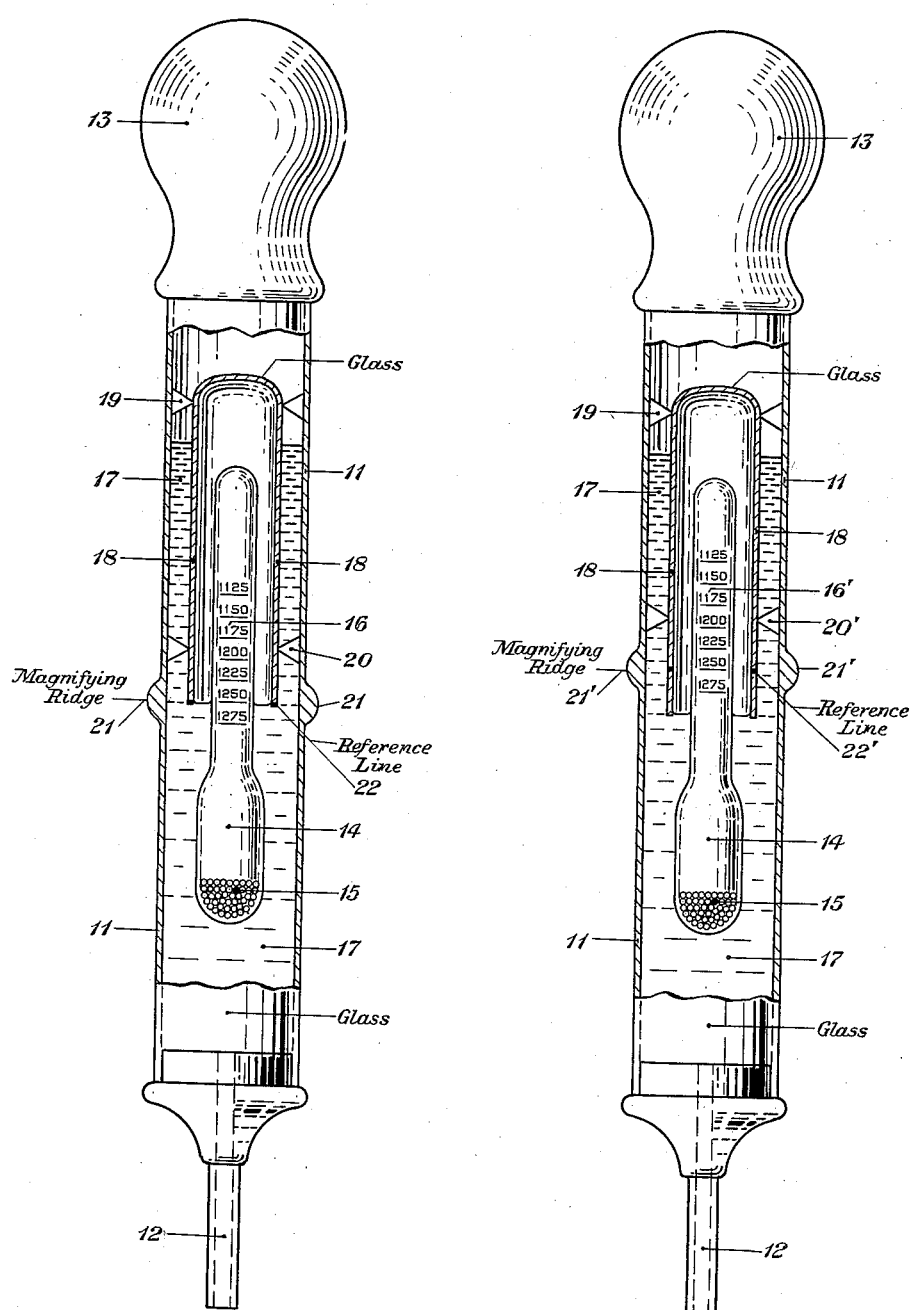

Patented Jan. 9, 1951

2,537,825

UNITED STATES PATENT OFFICE 2,537,825

SYRINGE HYDROMETER

William Edward Hardin, Lexington, Ky.

Application October 5, 1945, Serial No. 620,510

6 Claims. (Cl. 73—33)

This invention relates to hydrometers and more particularly to syringe hydrometers.

As is well understood in the art, the hydrometer is used to measure the specific gravity of liquids, and a common use is to measure the specific gravity of the electrolyte of a storage cell. This electrolyte, in the case of the lead-acid battery, for instance, is sulphuric acid diluted with water. If the cell is covered the only access to the electrolyte for test purposes is through a vent hole or the equivalent in the cover of the cell. In such case the syringe hydrometer is used to withdraw a suitable quantity of the electrolyte for testing.

With the hydrometers of this type heretofore available it has been found necessary, in order to obtain satisfactory readings, to gauge carefully the amount of squeeze on the syringe bulb and to hold a suitable pressure on the bulb to prevent the float level—i. e., the surface of the liquid upon which the hydrometer proper floats—from being too high or too low for ready reading.

The principal object of this invention is to facilitate and expedite the reading of the specific gravity of the liquid under test. Other objects and advantages of the invention will appear from an examination of the following description.

In accordance with the invention the above-stated object is attained by a novel arrangement of an inner chamber within the syringe chamber, which controls the float level within the syringe chamber.

The invention will be clearly understood from a reading of the subjoined detailed description of two desirable embodiments. This description is to be read with reference to the accompanying drawing, in which—

Figure 1 shows partly in elevation and partly in longitudinal section a simple embodiment of the invention, and Fig. 2 shows in like manner an embodiment which is a modification of that shown in Fig. 1.

Like numerals of reference in the two figures of the drawing designate corresponding parts.

With reference to the details of the drawing, and first with particular reference to Fig. 1, the outer tube or syringe barrel 11, shown in elevation at top and bottom and in section over the intermediate portion, is made of glass or other suitable transparent material and may be, and preferably is, of substantially constant diameter. At the lower end of tube 11 is an inlet tube 12 of smaller diameter which may be inserted in the vent hole of a storage cell cover. Fitted to the top of the tube 11 is a rubber bulb 13 which is manually operated to draw an indefinite quantity of the electrolyte into the barrel 11 through the inlet tube 12.

A hydrometer float element 14, shown in elevation, is located within the tube 11 and contains at the bottom of its enlarged portion a suitable quantity of lead shot or the equivalent as a weight 15. The upper portion 16 of the hydrometer is in the form of a stem with the usual graduated scale, specifically shown as suitable for the measurement of the specific gravity of the electrolyte used in lead-acid batteries. When a quantity of the electrolyte 17 enters the tube 11 the hydrometer floats therein in an upright position and the weight of the liquid displaced is equal to the weight of the hydrometer. Accordingly, as is well understood in the art, the position of the stem 16 indicates the specific gravity of the electrolyte, and the graduations permit accurate measurement.

In order to fix the float level within the barrel 11 and thus avoid the trouble and delay involved in adjusting this level for suitable reading, applicant places within the upper portion of the barrel 11 an inner tube 18, shown in section, which is of substantially smaller diameter than the outer tube 11 and is made of glass or other suitable transparent material. This inner tube is fixed within the outer tube and in spaced relation thereto by any suitable means, such as the supports 19 and 20. The only functional requirement of these devices, in addition to that of support of the inner tube, is that they permit the passage of liquid into the upper end of the tube 11. It will be noted that the tube 18 is closed at the top and open at the bottom. It is preferably concentric with the outer tube 11.

When the indefinite quantity of electrolyte is drawn into the syringe barrel through inlet tube 12 by the operation of bulb 13, the air pressure in the tube 18 prevents the liquid from rising appreciably in that tube and forces any excessive liquid up around the inner tube into the upper portion of the outer tube, and, if the quantity is so great, into the bulb. Thus as long as the quantity of liquid drawn into the barrel is within reasonable limits the float level will be established at the bottom of the tube 18, or without appreciable separation therefrom, and the reading of the graduated scale of hydrometer stem 16 will be taken at this level of the lower end of the inner tube.

If it is desired to magnify the view of the hydrometer scale the outer tube 11 may be equipped opposite the lower end of the inner tube 18 with a magnifying ridge 21, shown in section, but understood to extend transversely around the tube. This magnifying means is focused on the graduations of the float stem 16. It will be understood that the lower end of tube 18 may serve as a reading mark in co-operation with the graduations of stem 16 of the float element. Preferably the lower end carries a reference line or index 22.

While the device disclosed in Fig. 1 of the drawing takes advantage in simple form of the control of the float level brought about by the use of the inner tube 18, it may be desirable for certain purposes to use the modified form of hydrometer disclosed in Fig. 2.

In the case of Fig. 2, instead of the use of the lower end of tube 18—or an index aligned with that end—as the line or mark with reference to which the reading of the float scale is taken, an index or reference line 22' appears around the tube 18 at a definite, predetermined distance from the lower end, and the graduated scale is placed correspondingly higher on the steam 16' of the float member. With this arrangement the constant float level is maintained substantially at the lower end of the inner tube, but the reading is taken at the higher level and will be unobscured by the meniscus of the liquid level. If the magnifying feature is desired, a magnifying ridge 21' is aligned with the index 22', with focus on the scale graduations.

From the above description it will be understood that in using applicant's syringe hydrometer the bulb 13 is squeezed to draw into the device any reasonable amount of the electrolyte to be tested and the operator is not required to gauge carefully or to hold the pressure on the bulb. The reading is taken at the constant float level at the lower end of the inner tube 18, or at a definite level, marked by a suitable index, which is at a predetermined distance from the lower end of the tube. Thus the reading of the specific gravity is obtained readily and quickly.

While the invention has been disclosed in two specific embodiments for the purpose of illustration, it is to be understood that the embodiment may take other and different forms within the scope of the appended claims.

What is claimed is:

1. A syringe hydrometer comprising a transparent outer tube, means for drawing into said tube through the lower end thereof an indefinite quantity of a liquid to be tested, a float member in said tube, and an inner tube concentric with said outer tube and mounted in the upper portion thereof in fixed relation thereto, said inner tube having its upper end closed and its lower end open.

2. In a syringe hydrometer, a transparent outer tube, means for drawing into said tube through the lower end thereof a quantity of a liquid to be tested, a float member in said tube, and an inner tube of substantially smaller diameter than said outer tube and fixedly spaced therefrom in the upper portion thereof, said inner tube being closed at its upper end and open at its lower end, whereby, when the liquid is drawn into said outer tube, a float level will be maintained substantially at the lower end of said inner tube and any excessive liquid will be drawn into the upper portion of said outer tube around the wall of said inner tube.

3. A hydrometer comprising a transparent outer tube adapted at its lower end for the suction of a quantity of liquid into said tube, a syringe bulb fitted to the upper end of said tube for drawing the liquid thereinto through the lower end thereof, a transparent inner tube closed at the top and open at the bottom and located within the upper portion of said outer tube, said inner tube being of substantially smaller diameter than said outer tube and fixedly spaced from the inner wall thereof, and a float member within said outer tube having a graduated stem adapted to extend within said inner tube when the liquid fills the lower portion of said outer tube.

4. In a hydrometer including a syringe chamber and a float member, a tube within and fixedly spaced from the chamber and closed at its upper end to maintain a substantially constant float level at its lower end.

5. In a hydrometer including a transparent syringe barrel and a graduated float member, a transparent tube within and fixedly spaced from the barrel and closed at its upper end to maintain a substantially constant float level at its lower end, and an index positioned in predetermined relation to the lower end of said tube and designed for visual cooperation with the graduations of the float member.

6. In a syringe hydrometer, two spaced concentric tubes, one enclosing and supporting the other, each of said tubes being of substantially constant diameter, the inner tube being closed at its upper end and open at its lower end, means for drawing liquid into the outer tube through the lower end thereof, and a float indicator having a stem adapted to extend within the inner tube.

WILLIAM EDWARD HARDIN.

REFERENCES CITED

The following references are of record in the file of this patent:

UNITED STATES PATENTS

| Number | Name | Date |
|---|---|---|
| 1,706,234 | Jewell et al. | Mar. 19, 1929 |
| 1,790,696 | Bridge | Feb. 3, 1931 |
| 1,844,055 | Boyce | Feb. 9, 1932 |
| 2,393,522 | Edelmann | Jan. 22, 1946 |